(12) United States Patent
Ryne et al.

(10) Patent No.: US 11,254,351 B2
(45) Date of Patent: Feb. 22, 2022

(54) STEERING MODE SELECTION USING MACHINE LEARNING

(71) Applicant: STEERING SOLUTIONS IP HOLDING CORPORATION, Saginaw, MI (US)

(72) Inventors: Zaki Ryne, Saginaw, MI (US); Rakesh Mitra, Saginaw, MI (US); Tao Yang, Midland, MI (US); Scott T. Sanford, Swartz Creek, MI (US); Michael R. Story, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 924 days.

(21) Appl. No.: 15/457,411

(22) Filed: Mar. 13, 2017

(65) Prior Publication Data
US 2018/0257698 A1 Sep. 13, 2018

(51) Int. Cl.
| | | |
|---|---|---|
| *B62D 5/04* | (2006.01) | |
| *B62D 6/00* | (2006.01) | |
| *B62D 6/04* | (2006.01) | |
| *B62D 6/08* | (2006.01) | |
| *G05B 13/02* | (2006.01) | |

(52) U.S. Cl.
CPC ......... *B62D 5/0463* (2013.01); *B62D 5/0457* (2013.01); *B62D 6/007* (2013.01); *B62D 6/04* (2013.01); *B62D 6/08* (2013.01); *G05B 13/0265* (2013.01); *B62D 5/0421* (2013.01)

(58) Field of Classification Search
CPC .. B60W 2520/14; B60W 10/06; B60W 10/11; B60W 10/184; B60W 10/20; B60W 2050/0089; B60W 2520/125
See application file for complete search history.

(56) References Cited

U.S. PATENT DOCUMENTS

| | | | | |
|---|---|---|---|---|
| 5,183,127 A | * | 2/1993 | Kageyama | ......... B60G 17/0195 180/197 |
| 2004/0193345 A1 | * | 9/2004 | Chen | ...................... B62D 6/003 701/42 |

(Continued)

FOREIGN PATENT DOCUMENTS

| | | |
|---|---|---|
| CN | 103826950 A | 5/2014 |
| CN | 105416392 A | 3/2016 |

(Continued)

OTHER PUBLICATIONS

Chinese Search Report for related Chinese Application No. 2018102036805; dated Apr. 16, 2020; 3 pages.

(Continued)

*Primary Examiner* — Redhwan K Mawari
(74) *Attorney, Agent, or Firm* — Dickinson Wright PLLC

(57) ABSTRACT

Technical features of a steering system include a control module that dynamically determines an operating mode based on a set of input signal values such as lateral acceleration signal values and corresponding handwheel position values. The control module dynamically determines and learns classification boundaries between multiple operating modes based the input signal values. The control module further calibrates the steering system according to operating mode that is determined using the classification boundaries.

20 Claims, 12 Drawing Sheets

(56) References Cited

U.S. PATENT DOCUMENTS

| | | | |
|---|---|---|---|
| 2010/0250066 A1* | 9/2010 | Eckstein | B60K 31/042 |
| | | | 701/41 |
| 2011/0231052 A1* | 9/2011 | Ellis | B60T 7/12 |
| | | | 701/31.4 |
| 2012/0109416 A1* | 5/2012 | Mizutani | 701/1 |
| 2013/0103263 A1 | 4/2013 | Hsu et al. | |
| 2013/0179044 A1* | 7/2013 | Ishikawa | B60W 10/11 |
| | | | 701/53 |
| 2014/0032049 A1* | 1/2014 | Moshchuk | B62D 15/0265 |
| | | | 701/42 |
| 2015/0127200 A1* | 5/2015 | Takeuchi | B60W 10/04 |
| | | | 701/22 |
| 2015/0224845 A1* | 8/2015 | Anderson | B60G 17/019 |
| | | | 701/37 |
| 2017/0210420 A1* | 7/2017 | Saeger | B62D 6/002 |
| 2017/0313323 A1* | 11/2017 | Tseng | B60K 35/00 |
| 2017/0334454 A1* | 11/2017 | Abe | B60W 10/20 |
| 2018/0216727 A1* | 8/2018 | Sakai | F16H 61/0213 |
| 2018/0257698 A1* | 9/2018 | Ryne | B62D 5/0457 |

FOREIGN PATENT DOCUMENTS

| | | |
|---|---|---|
| CN | 106394668 A | 2/2017 |
| DE | 102011121719 A1 | 6/2013 |

OTHER PUBLICATIONS

Official Communication from the Chinese Patent Office for related Chinese Application No. 201810203680.5; dated Apr. 26, 2020; 5 pages.

* cited by examiner

MIN-TABLE 310

| HwPos (Deg) | LatAcc-Min (g) | VEHICLE SPEED (kph) |
|---|---|---|
| -100 | -4 | 20 |
| -99 | -3 | 30 |
| . | . | . |
| . | . | . |
| 0 | 0 | 100 |
| . | . | . |
| . | . | . |
| +99 | 2.8 | 26 |
| +100 | 4.5 | 35 |

MAX-TABLE 320

| HwPos (Deg) | LatAcc-MAX (g) | VEHICLE SPEED (kph) |
|---|---|---|
| -100 | -6 | 50 |
| -99 | -4 | 60 |
| . | . | . |
| . | . | . |
| 0 | 0 | 70 |
| . | . | . |
| . | . | . |
| +99 | 5 | 57 |
| +100 | 7 | 55 |

FIG. 4

STEERING MODE SELECTION USING MACHINE LEARNING

BACKGROUND

A vehicle may have multiple operating modes such as a sport mode, a comfort mode, economical, and so on. Each mode may change the configuration of one or more parts of the vehicle that change the operations such as a gear-shifting, acceleration, handling, suspension, traction control, and so on. Typically, a driver manually selects a mode for operating the vehicle according to his/her desire, for example using a button, a knob, or any other user interface element. However, such manual options can distract the driver. Further, the driver may not be in a position to change the operating mode quickly in case of events such as a road-block, traffic, an emergency, or any other such events. Accordingly, it is desirable to switch operating modes of a vehicle automatically, or dynamically in real time without manual intervention.

SUMMARY

According to one or more embodiments, a steering system includes a control module that dynamically determines an operating mode based on a set of input signal values comprising a plurality of lateral acceleration signal values and respectively corresponding handwheel position values. The control module further calibrates the steering system according to the determined operating mode.

According to one or more embodiments, a method implemented by a steering system includes operating according to a first operating mode, receiving a set of input signal values comprising a plurality of lateral acceleration signal values and respectively corresponding handwheel position values. The method further includes determining a second operating mode based on the set of input signal values and switching the steering system from the first operating mode to the second operating mode by calibrating the steering system according to the second operating mode.

According to one or more embodiments, power steering system includes a control module. The control module dynamically learns a classification boundary between a first operating mode and a second operating mode, the classification boundary based on a first set of input signal values comprising a plurality of lateral acceleration signal values and respectively corresponding handwheel position values. The control module further collects a second set of input signal values during operation of the power steering system in the first operating mode. The control module further dynamically switches from the first operating mode to the second operating mode based on the second set of input signal values corresponding to the second operating mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 illustrates examples of a min-table and a max-table according to one or more embodiments;

DETAILED DESCRIPTION

Figure 1:
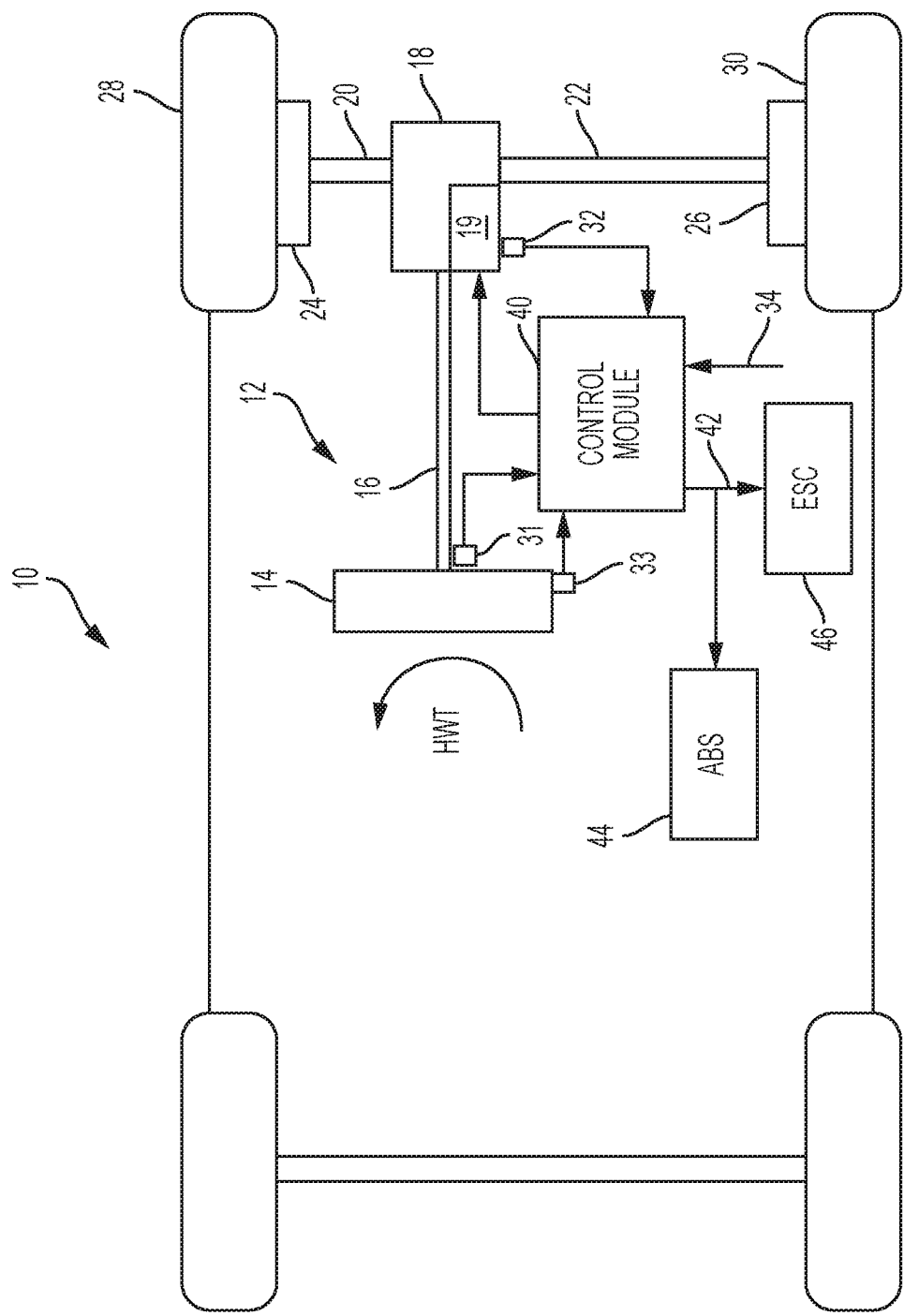
FIG. 1 illustrates an exemplary embodiment of a vehicle including a steering system according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions described herein address the technical limitations of manual switching of driver modes of a vehicle using a user-interface element. The technical solutions facilitate dynamically changing the mode using machine learning based on output from one or more sensors of a steering system of the vehicle, in real time, without manual selection by a driver. In addition to the automatic switching, the technical solutions herein reduce system cost by avoiding use of one or more user interface elements (buttons, knobs, touchscreen etc.) for switching the operating mode. Further, the technical solutions herein facilitate adapting dynamics of the steering to match the performance that the driver desires by switching the operating mode. For example, the operating mode may be a sport mode, a comfort mode, an economical mode, and so on. Further yet, because the operating mode is switched dynamically using machine learning, the technical solutions herein adapt to changes made to the vehicle, such as a change in tires, suspension, or any other component. The technical solutions, in response to such changes, dynamically adapt a decision boundary that is to used to select the operating mode.

Each mode may change the configuration of one or more parts of the vehicle that change the operations such as a gear-shifting, acceleration, handling, suspension, traction control, and so on. Further, in each operating mode, the steering feel may be different. For example, each operating mode may provide a corresponding torque assist and/or feedback to the driver. For example, in the sport mode, the driver may have a tighter steering-feel because of a lower torque assist value compared to the comfort mode in which the driver may have a softer steering-feel because of a higher torque assist value provided by the steering system. Further, in the comfort mode the suspension may be placed in its softest setting, gear changes may occur earlier to eliminate high revolutions of the engine, and the steering ratio may be set to a specific value. The steering ratio is the ratio of the number of degrees of turn of the handwheel 14 to the number of degrees the wheel(s) turn as a result. In the sport mode to make the ride more 'sporty' in nature with stiff ride and less body roll, the settings may facilitate the engine to rev higher before gears are changed, the gears may facilitate downshifts quicker, and the throttle response may also adjusted for the engine to be eager and responsive when the accelerator is pressed. The steering ratio may also be adjusted specific to the sport mode. Further yet, in one or more examples, an economy operating mode may have calibration settings to for the engine, transmission, and even air conditioning/climate control to produce optimal fuel economy ratings that the vehicle can offer.

Referring now to the Figures, where the invention will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10. While FIG. 1 illustrates an EPS that is a rack and pinion steering system, in one or more examples, the EPS may be a steer by wire steering system.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon. In one or more examples, using the handwheel position signal from the sensor 33, a handwheel velocity may be computed, for example by differentiating the handwheel position signal. Further yet, in one or more examples, the sensors may further include a lateral acceleration sensor that measures a lateral acceleration of the vehicle and outputs a lateral acceleration signal.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34. Further, in other examples, the control module 40 of the steering system 12 communicates via the vehicle network with one or more electronic control units (ECU) of the vehicle, such as an Engine Control Module (ECM), a Powertrain Control Module (PCM), a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), or any other or a combination thereof.

For example, the steering control module 40 determines an operating mode based on the signals received from the one or more sensors 31-33 and sends a signal to the one or more ECUs indicative of the operating mode. Alternatively, or in addition, the steering control module 40 determines a change in the operating mode, and in response, sends the signal indicative of the selected operating mode.

Figure 2:
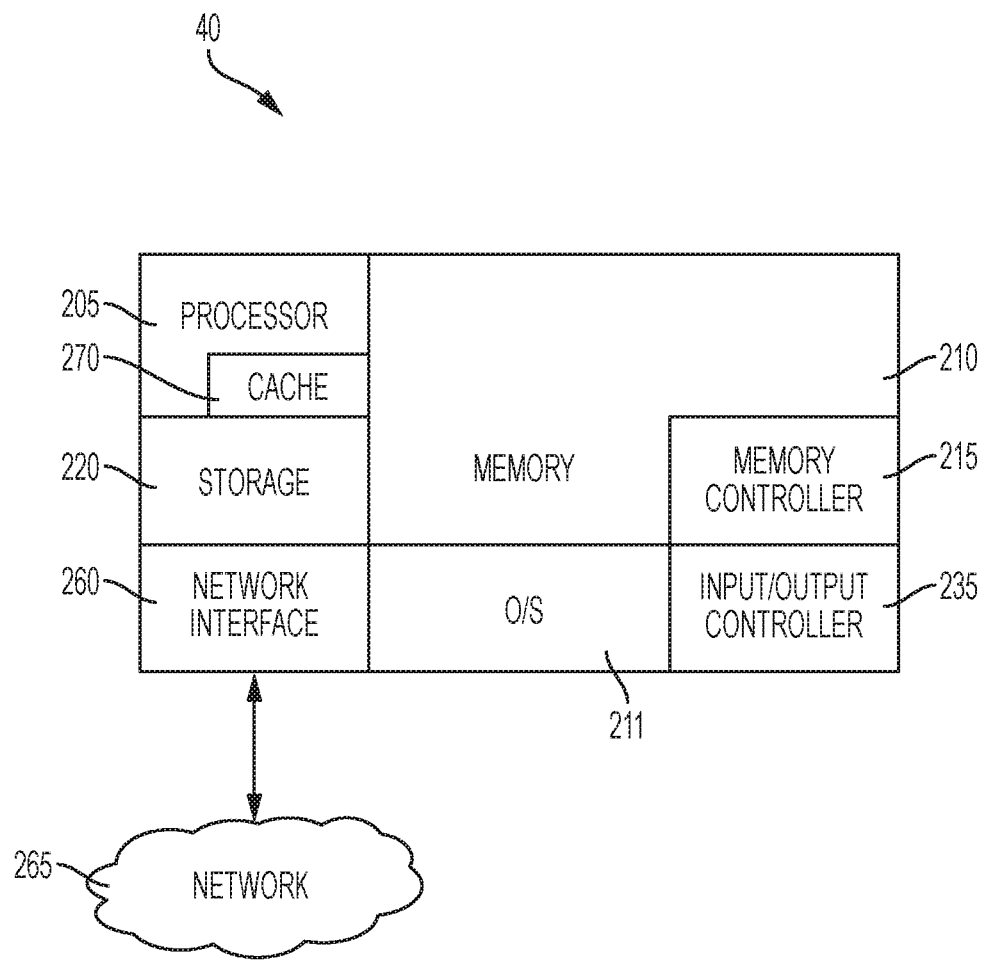
FIG. 2 illustrates an example steering control module according to one or more embodiments.

FIG. 2 illustrates an example steering control module 40. The steering control module 40 may be an ECU, such as a microcontroller or any other device that communicates via a vehicle network 265. The steering control module 40 includes hardware, such as electronic circuitry, that executes software.

The steering control module 40 includes, among other components, a processor 205, memory 210 coupled to a memory controller 215, and an I/O controller 235. Input devices such as a keyboard and mouse may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications. The I/O controller 235 may communicate with the one or more sensors 31-33 and receive the signals from the sensors 31-33.

The processor 205 is a hardware device for executing hardware instructions or software, particularly those stored in memory 210. The processor 205 may be a custom made or commercially available processor, a central processing unit (CPU), an auxiliary processor among several processors associated with the steering control module 40, a semiconductor based microprocessor (in the form of a microchip or chip set), a macroprocessor, or other device for executing instructions. The processor 205 includes a cache 270, which may include, but is not limited to, an instruction cache, a data cache.

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein. The steering control module 40 may further include a display controller coupled to a user interface or display. In some embodiments, the display may be an LCD screen. In other embodiments, the display may include a plurality of LED status lights.

In some embodiments, the steering control module 40 may further include a network interface 260 for coupling to a network 265. The network 265 may be a controller area network (CAN) that facilitates the one or more ECUs in the vehicle to communicate with each other. Alternatively, or in addition, the network 265 may use any other protocol, such as an IP-based protocol, for communication between the one or more ECUs. The network 265 may be implemented in a wired or a wireless fashion.

Figure 3:
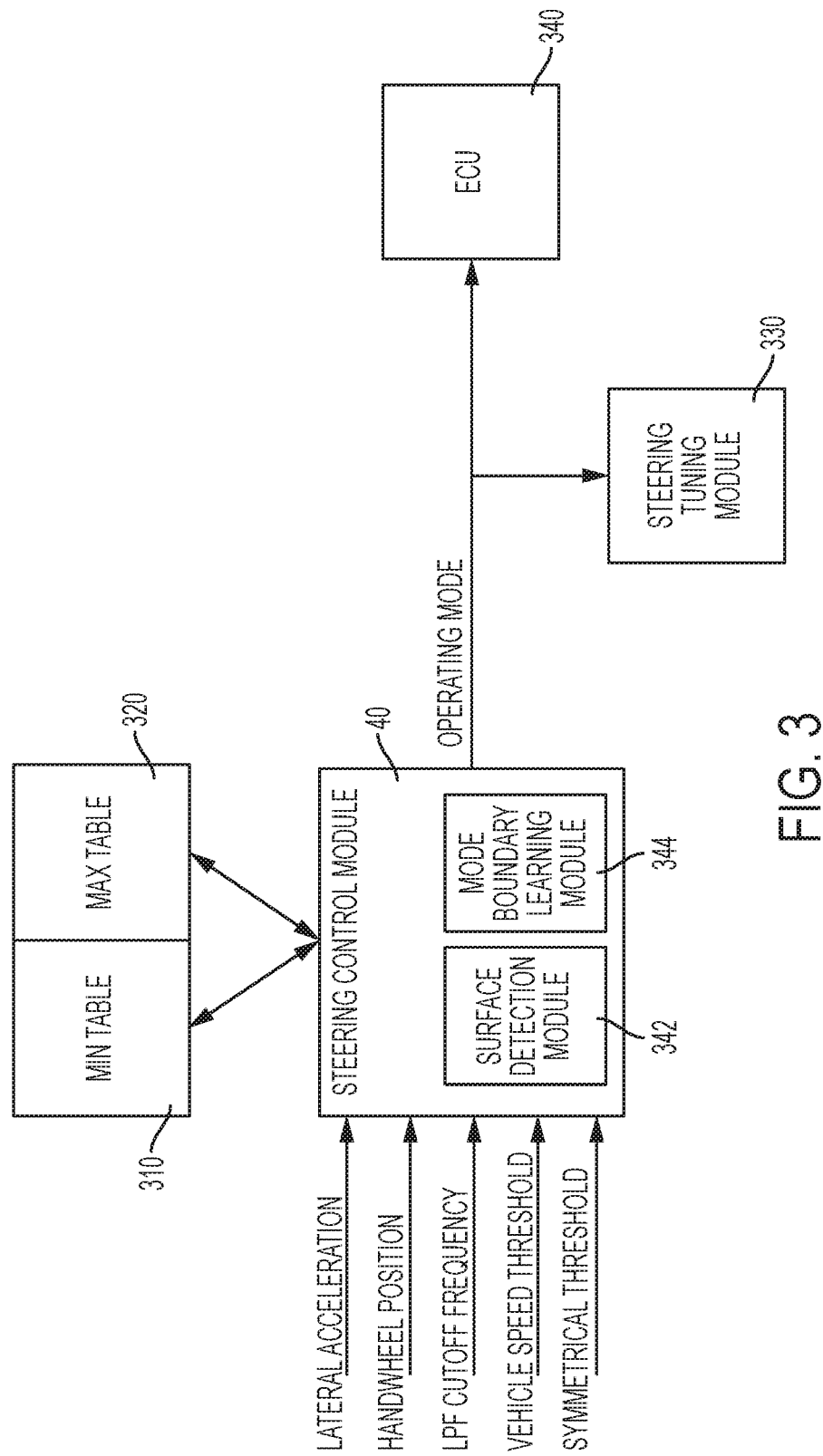
FIG. 3 depicts an example block diagram of a system to determine and use an operating mode using a steering control module according to one or more embodiments.

FIG. 3 depicts an example block diagram of a system that determines and uses an operating mode using the steering control module 40. The control module 40 receives multiple input signals including a lateral acceleration of the vehicle, a handwheel position of the handwheel 14, a low-pass filter (LPF) cutoff frequency, a vehicle speed threshold, and a symmetrical threshold. The control module 40 may receive the lateral acceleration as an output of a lateral acceleration sensor and/or from another ECU of the vehicle 10. The control module 40 may receive the handwheel position from a handwheel sensor. The control module 40 may receive the LPF cutoff frequency, the vehicle speed threshold, and the symmetrical threshold as input from the memory 210. Alternatively, or in addition, in one or more examples, the control module 40 itself may compute the LPF cutoff frequency, the vehicle speed threshold, and the symmetrical threshold. The control module 40 dynamically, selects an operating mode based on the input signals, without manual intervention, and in real time.

In one or more examples, the control module 40 requests a switch of the steering system from a current operating mode to the selected operating mode. For example, the control module 40 indicates to a steering tuning module 330 the selected operating mode. The steering tuning module 330, in response, calibrates the steering system 12 according to the selected operating mode.

The control module 40 may further request one or more ECUs 340 from the vehicle 10 to recalibrate according to the selected operating mode. For example, the braking system, the suspension system, or any other ECU 340 in the vehicle 10 receives the request from the control module 40.

In one or more examples, the control module 40 continuously receives the input signals. For example, the control module 40 receives the input signals at a predetermined frequency while the vehicle is being operated, that is while the driver is driving. In one or more examples, the control module 40 receives the input signals from the sensors of the vehicle and from a prediction model, such as a linear or non-linear Bicycle model, or the like. The control module 40 includes a surface detection module 342 that determines which input signals to use from among the input signals from the sensors and from the prediction model, as described herein. Further, the control module 40 further includes a mode boundary learning module 344 that dynamically learns, using machine learning, a decision boundary for the one or more operating modes for the vehicle 10 using the input signals.

In one or more examples, the control module 40 creates and/or populates one or more tables. It should be noted that while the examples described herein use 'tables' to store and retrieve the data, in other examples, the data may be stored using other data structures and a combination thereof, such as graphs, trees, and the like.

For example, the mode boundary learning module 344 uses two decision tables, a min-table 310 and a max-table 320. The max-table 320 collects the maximum of lateral acceleration values for corresponding handwheel positions. The min-table 310 collects the minimum of the lateral acceleration values for corresponding handwheel positions. In one or more examples, the corresponding vehicle speed signal value is also stored. FIG. 4 illustrates examples of min-table 310 and max-table 320. For example, an entry in the min-table 310 includes a handwheel position, a minimum lateral acceleration value recorded at that handwheel position, and a vehicle speed at which the minimum lateral acceleration at the handwheel position was recorded.

Further, an entry in the max-table 320 may include the handwheel position, the maximum lateral acceleration value at that handwheel position, and a vehicle speed at which the maximum lateral acceleration value at that handwheel position is recorded.

In one or more examples, the data collected in the min-table 310 and the max-table 320 is based on a handwheel position being within a predetermined +/− handwheel position spread (in deg, or rad). For example, the control module 40 accesses a vehicle speed vs handwheel position range table at the vehicle speed threshold, to ensure that the handwheel position is within the handwheel position spread for the vehicle speed.

Figure 5:
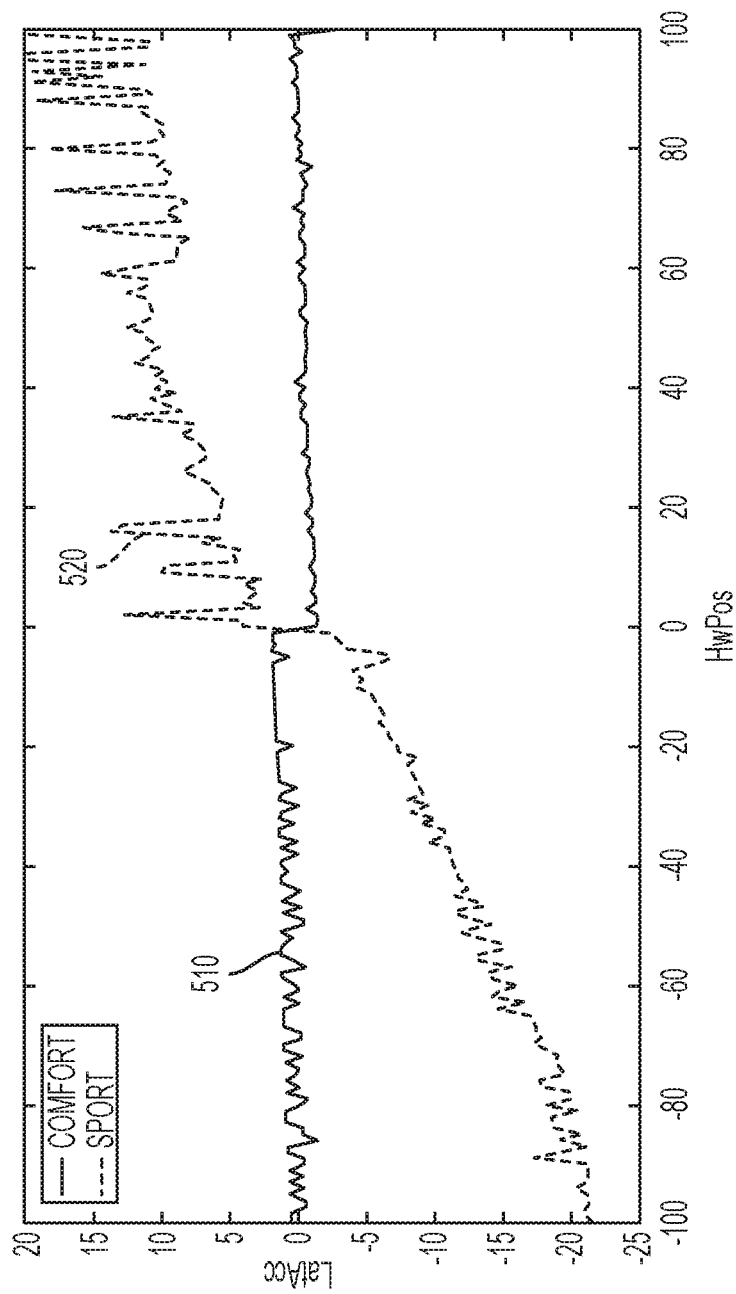
FIG. 5 illustrates example comparison of operating modes according to one or more embodiments.

Lateral acceleration is the acceleration created when the vehicle corners and that tends to push a vehicle sideways because the vehicle is pushed outward by centrifugal force. Typically, the lateral acceleration is the "g force." Based on the operating mode the lateral acceleration experienced by the vehicle varies. For example, FIG. 5 illustrates an example 'sport' mode and a 'comfort' mode comparison, where the lateral acceleration caused by the driver's movement of the steering wheel 14 in the sport mode is more than that in the comfort mode. For example, the comfort mode data 510 and the sport mode data 520 are based on the data collected in the min-table 310 and the max-table 320. As the driver continues to drive, the min-table 310 and the max-table 320 are continuously updated for specific hand wheel positions.

It should be noted that while the example herein depicts the sport and the comfort modes, in other examples the vehicle may have more operating modes, such as economical, sport pro, and the like. Further, the names of the operating modes used here are just examples, and the modes may be referred to by other names in other examples.

Typically, as described earlier, a driver selects the operating mode manually. The technical features described herein facilitate the steering system, for example using the control module 40, to detect a switch in the operating mode dynamically, or automatically based on one or more parameters, such as the lateral acceleration, vehicle speed, handwheel position, and the like. Further, based on the determination of the switch, the steering system may cause other ECUs in the vehicle 10 to adjust their respective operating configurations to according to the switched operating mode. For example, the technical features described herein facilitate the steering system to dynamically detect a switch from the comfort mode to the sport mode and/or vice versa, and indicate to the other ECUs to switch operating according to the sport mode (or comfort mode) instead of the comfort mode (or sport mode).

Figure 6:
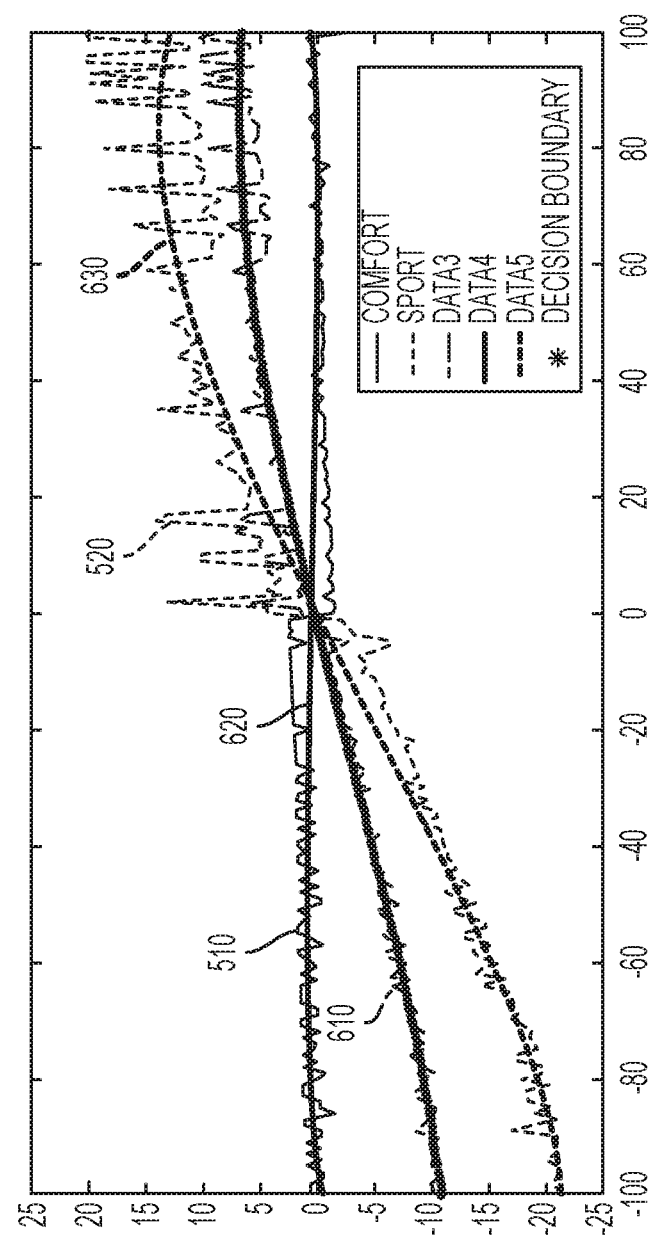
FIG. 6 illustrates an example decision boundary that is used to predict the probability that an operating mode is a first mode or a second mode according to one or more embodiments.

For example, the mode boundary learning module 344 uses the data from the min-table 310 and the max-table 320 and determines a model to identify one or more patterns for the one or more operating modes respectively. For example, as depicted in FIG. 6, the mode boundary learning module 344 determines a decision boundary 610 to predict the probability that the operating mode is a first mode or a second mode, for example, comfort mode or sport mode, based on values of vehicle speed, lateral acceleration, and corresponding handwheel position over a predetermined duration. The decision boundary 610, thus, classifies the collected data into two classes—first operating mode and a second operating mode. In other words, the decision boundary 610 (or decision surface) partitions the underlying data into two sets, one for each operating mode. It should be noted that in other cases with more than two operating modes, the control module 40 determines multiple decision boundaries, or any other classifiers for categorizing the data corresponding to the different operating modes. The mode boundary learning module 344 determines the decision boundary 610 using machine learning, for example, support vector machines. In one or more examples, the mode boundary learning module 344 determines the decision boundary as a polynomial, such as a third order polynomial, using regression. In one or more examples, the decision boundary polynomial is periodically updated based on the data in the min-table 310 and the max-table 320 that is continuously collected. Further, the control module 40, using the mode boundary learning module 344, determines models for each of the operating modes.

For example, FIG. 6 illustrates a comfort mode model 620 and a sport mode model 630. Accordingly, the mode boundary learning module 344 classifies the data from the min-table 310 and the max-table 320 using the decision boundary 610, the comfort mode model 620, and the sport mode model 630, to determine which operating mode the vehicle 10 is currently being driven in. Further, the mode boundary learning module 344 determines whether the mode has switched from a previous mode, and takes one or more actions in response.

Figure 7:
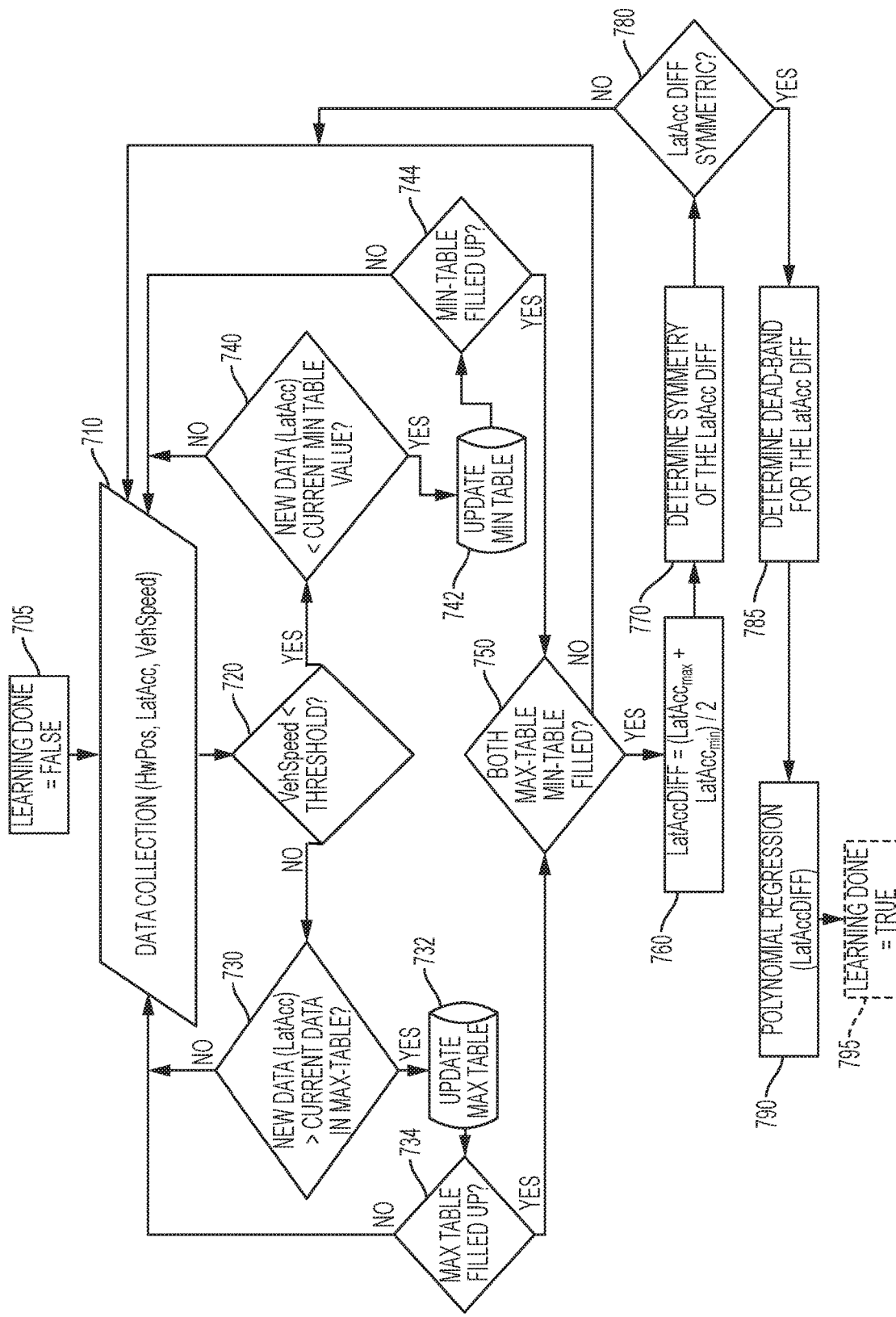
FIG. 7 illustrates a flowchart of an example method to determine a polynomial model for one or more operating modes according to one or more embodiments.

FIG. 7 illustrates a flowchart of an example method to determine the polynomial models for the one or more operating modes. In one or more examples, the mode boundary learning module 344 maintains a flag, referred to here as a learningDone flag that indicates whether the mode boundary learning module 344 has determined the models for the one or more operating modes. The mode boundary learning module 344 sets the learningDone flag to false at the outset, as shown at 705. As the vehicle 10 is driven, the mode boundary learning module 344, using the one or more sensors 31-33 receives parameters to be stored in the min-table 310 and the max-table 320, as shown at 710. For example, the mode boundary learning module 344 receives the handwheel position, the lateral acceleration, and the vehicle speed, among other parameters. In one or more examples, the received parameters further include additional or different sensor values that are used for determining the operating mode. For example, the received parameters may include a yaw rate, or any other input signal value for determining the operating mode.

In one or more examples, the mode boundary learning module 344 filters the data prior to storing the received data into the min-table 310 and the max-table 320. For example, the mode boundary learning module 344 compares the vehicle speed at the time the received data is collected, with a predetermined speed, such as 10 KPH, 15 KPH, or the like, as shown at 720. In one or more examples, the mode boundary learning module 344 may ensure that the handwheel position is within a predetermined handwheel position spread associated with the min-table 310 and the max-table 320. For example, if the handwheel position is not within the handwheel position spread, the received data may be ignored, and not recorded. If the handwheel position is within the handwheel position spread, as method may continue, by comparing the vehicle speed with the predetermined threshold, as shown at 720.

In case the vehicle speed is above the predetermined threshold, the mode boundary learning module 344 checks if the received lateral acceleration is greater than a stored lateral acceleration value in the max-table 320 corresponding to the handwheel position received, as shown at 730. If the received data is greater than the existing value in an entry corresponding to the received handwheel position value, the entry in the max-table 320 is updated, as shown at 732. For example, the received data may include a handwheel position of +90 deg, a lateral acceleration of 1.3 g, and a vehicle speed of 100 KPH. If the max-table 320 currently includes an entry for the handwheel position of +90 deg, where the lateral acceleration value is less than the 1.3 g, the entry is updated based on the 1.3 g received lateral acceleration, along with the vehicle speed of 100 KPH. If the existing lateral acceleration value in the entry is greater than (or equal to) the 1.3 g received value, the max-table 320 is not updated at this time.

Further, the mode boundary learning module 344 determines if the max-table 320 is filled up, as shown at 734. For example, the max-table 320 is deemed to be filled up if at least a predetermined number of entries in the max-table include non-zero lateral acceleration values, where the max-table 320 is initialized with zeros in each entry. In one or more examples, the max-table 320 may be initialized with a different value than zero. Further, in one or more examples, the max-table 320 is considered to be filled if each entry in the max-table 320 has a non-zero value. For example, the max-table 320 may include a predetermined number of entries, each entry corresponding to a specific handwheel position. If the max-table 320 is considered filled, the control module 40 proceeds to determine and/or update the models 610-630.

Alternatively, if the received vehicle speed is below the predetermined threshold, the mode boundary learning module 344 checks if the received lateral acceleration value is less than a value stored in an entry corresponding to the handwheel position in the min-table 310, as shown at 740. If the received data is lesser than the existing value in an entry corresponding to the received handwheel position value, the entry in the min-table 310 is updated, as shown at 742. For example, the received data may include a handwheel position of +90 deg, a lateral acceleration of 1.3 g, and a vehicle speed of 100 KPH. If the min-table 310 currently includes an entry for the handwheel position of +90 deg, where the lateral acceleration value is greater than the 1.3 g, the entry is updated based on the 1.3 g received lateral acceleration, along with the vehicle speed of 100 KPH. If the existing lateral acceleration value in the entry is lesser than (or equal to) the 1.3 g received value, the min-table 310 is not updated at this time.

Further, the mode boundary learning module 344 determines if the min-table 310 is filled up, as shown at 744. For example, the min-table 310 is deemed to be filled up if at least a predetermined number of entries in the min-table 310 include non-zero lateral acceleration values, where the min-table 310 is initialized with zeros in each entry. In one or more examples, the min-table 310 may be initialized with a different value than zero. Further, in one or more examples, the min-table 310 is considered to be filled if each entry in the min-table 310 has a non-zero value. For example, the min-table 310 may include a predetermined number of entries, each entry corresponding to a specific handwheel position. If the min-table 310 is considered filled, the control module 40 proceeds to determine and/or update the models 610-630.

For example, the mode boundary learning module 344 checks if both the min-table 310 and the max-table 320 are filled, as shown at 750. If the table are not filled, the mode boundary learning module 344 continues to populate the tables as described earlier. If the tables are filled up, the control module computes a lateral acceleration differential signal by computing averages of the values in the min-table 310 and the max-table 320, as shown at 760. In one or more examples, the lateral acceleration differential signal includes averages for each entry in the tables. It should be noted that in other examples, the lateral acceleration differential signal may be computed using a different statistic than the average of the values in the tables. The computed differential may be scaled up or down using a scaling factor.

Figure 8:
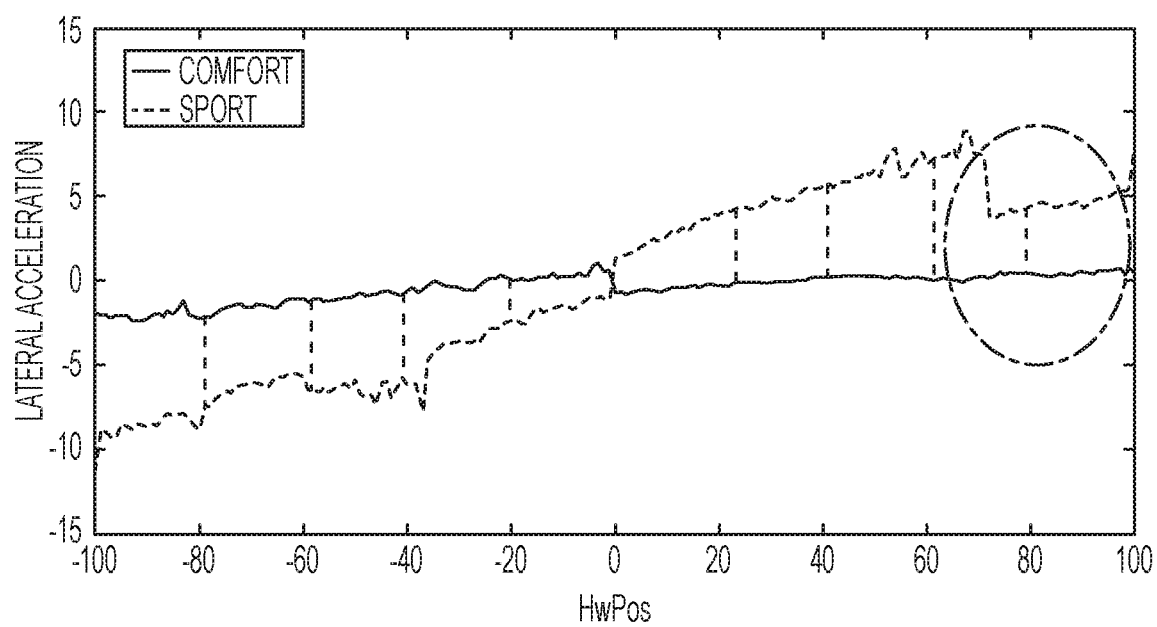
FIG. 8 illustrates symmetry of example data according to one or more embodiments.

In one or more examples, the control module ensures that the data collected in the min-table 310 and the data collected in the max-table 320 are symmetrical, as shown at 770. For example, FIG. 8 illustrates that the data at handwheel positions +40 deg and −40 deg are symmetrical (810), while at the handwheel positions +80 deg and −80 deg, the data is not symmetrical (820). For example, the mode boundary learning module 344 determines the symmetry of the data in the min-table 310 and the max-table 320 by comparing a difference between the lateral acceleration values at the +/− values of the handwheel positions with a predetermined symmetry threshold. If the symmetry threshold is crossed, the data is considered asymmetric and is considered symmetric otherwise.

In one or more examples, the symmetry is determined based on a second order difference. For example, a first difference between the lateral acceleration values in the min-table 310 and the max-table 320 for a specific+handwheel position is computed. Further, a second difference between the lateral acceleration values in the min-table 310 and the max-table 320 for the counterpart−handhweel position is computed. Further, a third difference between the two computed differences, the first difference, and the second difference is computed and compared with the symmetry threshold to determine the symmetry of the data.

If the data is symmetric for all of the entries in the min-table 310 and the max-table 320, the control module 40 proceeds to use the data for predicting the operating mode of the vehicle 10, as shown at 780. Otherwise, if the data is not symmetric, the control module continues to collect the data from the sensors into the min-table 310 and the max-table 320, as shown at 780.

Figure 9:
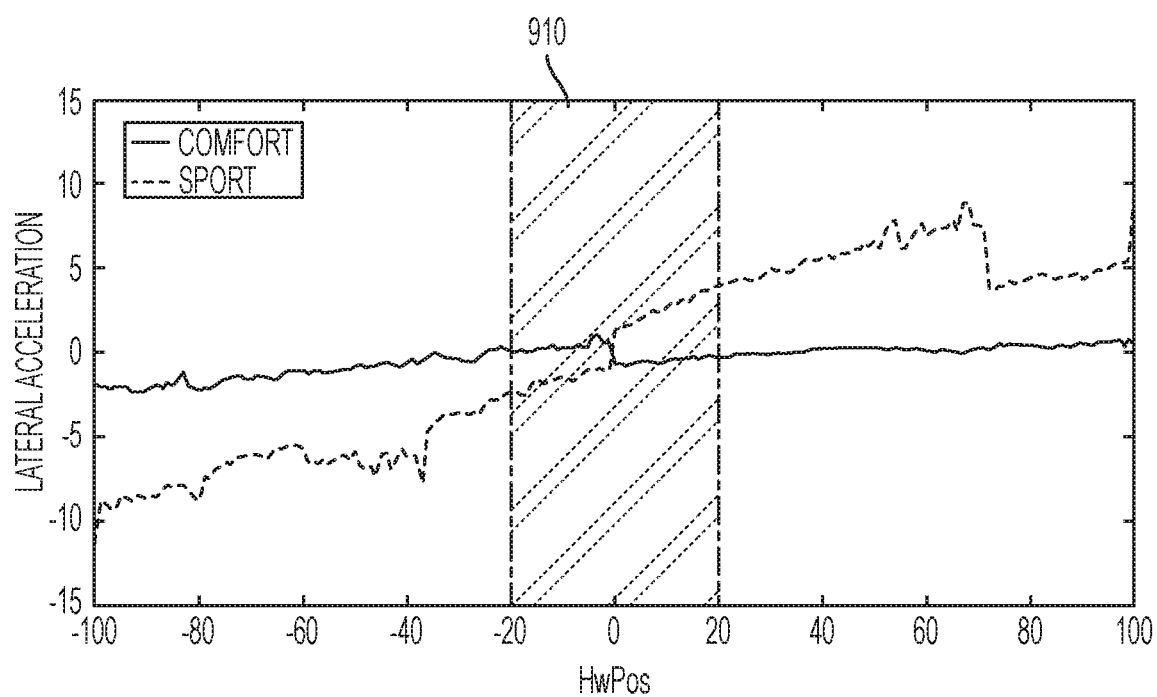
FIG. 9 illustrates an example dead band in example data according to one or more embodiments.

Further, in one or more examples, the mode boundary learning module 344 determines if the data being collected is from a dead-band, as shown at 785. The dead band reflects a range of the handwheel position in which the vehicle speed between one or more of the operating modes are random/indistinguishable from one operating mode to another. For example, FIG. 9 illustrates an example, where the vehicle speed and the lateral acceleration values for the vehicle 10 are indistinguishable between the comfort mode and the sport mode in the +20 deg to −20 deg range. Accordingly, in this case, the +20 deg to −20 deg is a dead band 910 in this case. In one or more examples, the dead band 910 may be a predetermined range. Alternatively, or in addition, the control module 40 determines the dead band 910 based on an average vehicle speed of the vehicle 10. For example, the limit of the dead band 910 (such as 20 in the above example) may be computed, for example as a percentage of the average speed, or any other formula.

The computed differential (LatAccDiff) is then used to compute or update the models 610-630 using polynomial regression, or any other machine learning technique, as shown at 790. The mode boundary learning module 344 further proceeds to set the learningDone flag to true to indicate that the mode boundary learning module 344 can dynamically categorize lateral acceleration and handwheel position data received henceforth, as shown at 795. In one or more examples, the mode boundary learning module 344 maintains the learningDone flag, and the computed model for the decision boundary 610 in non-volatile memory so that the data is available when the vehicle 10 is restarted. Once the mode boundary learning module 344 has computed the models, the control module 40 monitors the one or more parameters of the vehicle 10, such as the lateral acceleration, the vehicle speed, and the handwheel position, to dynamically detect the operating mode, and moreover a change in the operating mode to trigger a change in the configuration of the one or more ECUs in the vehicle 10 accordingly.

Because the mode boundary learning module 344 uses the input signal values to determine the models dynamically, any change in the input signal values dynamically updates the models. For example, if one or more components of the vehicle affecting the operating mode signals are changed, the input signal values received by the mode boundary learning module 344 change. Accordingly, the models 610-630 determined by the mode boundary learning module 344 change. For example, if the tires, and/or suspension of the vehicle 10 are changed, which affects the lateral acceleration experienced by the vehicle 10, the mode boundary learning module 344 receives new lateral acceleration values corresponding to the new tires and/or suspension. Alternatively, or in addition, the change may include wear and tear of the one or more components of the vehicle 10. By collecting the input signal values, and updating the models 610-630 continuously, the control module 40 has a dynamic decision boundary 610 corresponding to the operating condition of the vehicle 10, rather than a pre-programmed static model. For example, a typical vehicle may include a pre-programmed model (for example, bicycle model) that is based on the condition of the components when the vehicle was new (showroom condition). Therefore, the mode boundary learning module 344 facilitates determining the operating mode, and a change in the operating mode according to the changed components using a dynamic decision boundary 610. Accordingly, technical limitations of using a static model, such as a prediction model (bicycle model) are overcome by using dynamic machine learning techniques to identify the decision boundary 610.

Figure 10:
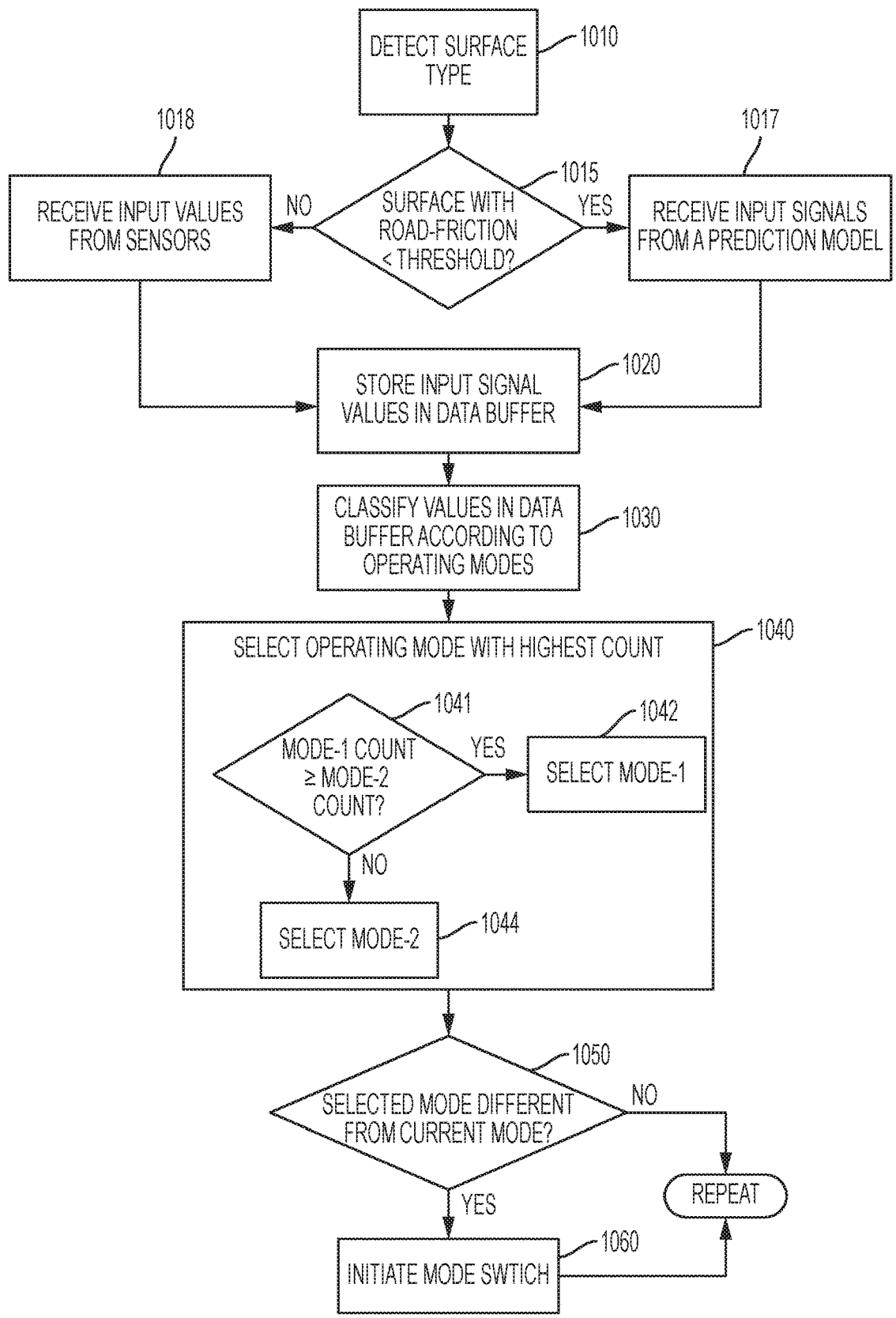
FIG. 10 illustrates a flowchart of an example method for dynamically detecting a change in operating mode according to one or more embodiments.

FIG. 10 illustrates a flowchart of an example method for dynamically detecting a change in the operating mode of the vehicle by the steering system. In one or more examples, the control module 40 monitors a type of surface on which the vehicle 10 is being driven, as shown at 1010. Depending on the type of the surface, the control module 40 determines the input signals to monitor.

For example, the control module 40 determines if the surface is a low road-friction (i.e. slippery) surface, for example snowy, as shown at 1015. For example, the control module 40 determines if the surface is slippery by comparing a road-friction value with a predetermined road-friction threshold. Alternatively, or in addition, in one or more examples, the control module 40 may receive an indication of the type of surface, for example via the CAN bus. Further yet, the control module 40 determines the surface type by comparing the input values from the sensors with those from a prediction model. It should be noted that although the example herein uses a slippery surface, in other examples, the control module 40 may determine whether the type of the surface is one from a predetermined list of surfaces based on the detected road-friction or the received signal via the CAN bus.

Figure 11:
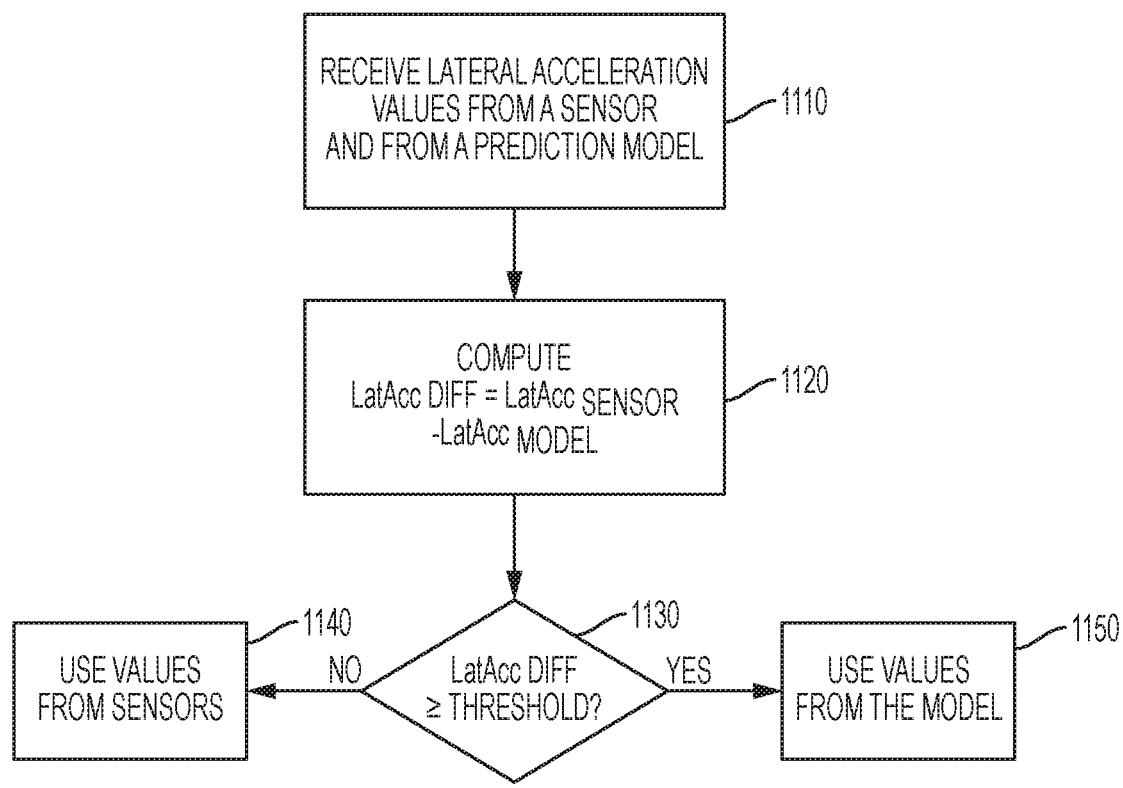
FIG. 11 illustrates a flowchart of any example method for detecting a type of a surface on which a vehicle is driving according to one or more embodiments.

FIG. 11 illustrates a flowchart of any example method for detecting the type of the surface on which the vehicle is driving, according to one or more embodiments. In one or more examples, the control module 40 executes the method for detecting the surface type. Alternatively, or in addition, the surface detection module 342 determines the type of the surface and indicates the type to the control module 40. For example, the surface detection module 342 receives a first lateral acceleration value from the sensor, and a second lateral acceleration value from a prediction model, as shown at 1110. For example, the prediction model may be a linear or a non-linear Bicycle model, or any other such models used for predicting the lateral acceleration and/or other parameters of the vehicle 10. The surface detection module 342 computes a difference between the two lateral acceleration values, as shown at 1120. The surface detection module 342 further compares the difference with a predetermined threshold value, as shown at 1130. If the difference is smaller than the predetermined threshold, the lateral acceleration values from the sensors are used for determining the operating mode, as shown at 1140. Otherwise, the lateral acceleration values generated by the prediction model are used for determining the operating mode of the vehicle, as shown at 1150. It should be noted that the embodiments herein use the lateral acceleration input signal and that in other examples, the technical solutions may use other sensor values in addition to or in place of the lateral acceleration signal as described herein. For example, in one or more examples, the steering system may use yaw rate values in addition to, or in place of the lateral acceleration values.

By using the sensors 31-33 at higher road-friction values, and the prediction model (the bicycle model) at lower road-friction values, the technical solutions described herein provide a robust solution to the technical problem of dynamically detecting and switching the operating mode in real time, without manual intervention, over a wider range of surfaces, irrespective of the road-friction. For example, the decision boundary 610 is strengthened by facilitating a continuous switching between the prediction model reference and actual vehicle response data from the sensors. This allows for a continuous decision boundary to be determined regardless of road-friction (surface-mu).

Thus, referring back to FIG. 10, if the type of the surface is of a predetermined type, such as a slippery surface, the control module 40 uses a prediction model to acquire the input values for detecting operating mode, as shown at 1017. Alternatively, the control module 40 acquires the input values for detecting the operating mode from the sensors 31-33, as shown at 1018. The acquired data is stored in a data buffer, as shown at 1020. In one or more examples, the control module 40 stores the input values over a predetermined duration, such as 30 seconds, 5 seconds, or any other predetermined duration. The control module 40, in one or more examples, replaces the data in the data buffer with the most recent input data. Alternatively, the control module 40 maintains a continuous stream of data in the data buffer. The data buffer may be part of the cache memory 270, the memory 210, the storage 220, and/or any other memory device associated with the processor 205.

The control module 40 classifies the values stored in the data buffer according to operating modes, as shown at 1030. For example, in case of the comfort mode and sport mode example herein, the control module 40 determines counts of a number of entries in the data buffer that are on either side of the decision boundary 610. That is, the control module 40 determines a first count of a number of lateral acceleration values at specific handwheel positions that are more than the corresponding lateral acceleration values on the decision boundary 610. The control module 40 also determines a second count of a number of lateral acceleration values at specific handwheel positions that are less than the corresponding values on the decision boundary 610.

The control module 40 checks which count is greater, the first count or the second count, as shown at 1040. For example, if the first count, with the lateral acceleration being above the boundary, is greater, the control module 40 concludes that the vehicle 10 is being driven in sport mode, as shown at 1041 and 1042. Else, if the second count, with the lateral acceleration values lesser than the boundary is greater, the control module 40 concludes that the vehicle 10 is being driven in the comfort mode, as shown at 1041 and 1044. Alternatively, or in addition, for example, in case of more than two modes, the control module 40 may determine the mode based on the counts of the lateral acceleration values in specific ranges corresponding to the modes respectively.

The control module 40 further determines if the detected operating mode is different from the current operating mode in which the vehicle 10 is being driven, as shown at 1050. If the detected mode is the same as the current mode, the control module 40 proceeds to the next iteration without any further action. Alternatively, if the detected operating mode is different from the current mode, the control module 40 initiates a change in the operating mode, as shown at 1060. The control module 40 iterates in this manner for dynamically switching the operating mode without manual intervention.

Figure 12:
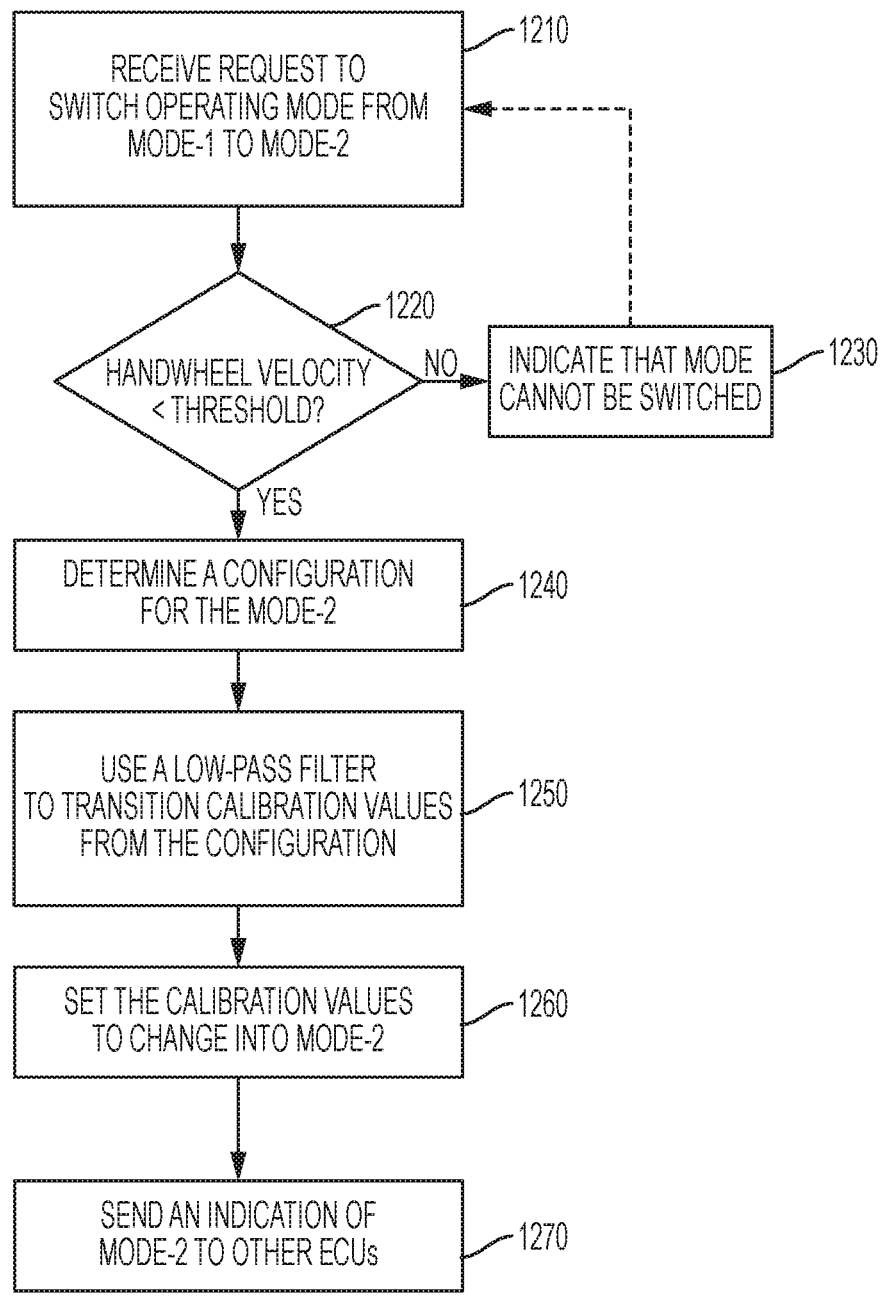
FIG. 12 illustrates a flowchart of an example method for initiating a change in operating mode according to one or more embodiments.

FIG. 12 illustrates a flowchart of an example method for initiating the change in the operating mode, in one or more examples. In one or more examples, the steering tuning module 344 may execute the method for switching the mode. Alternatively, the control module 40 executes the method. In one or more examples, the steering tuning module 344 is part of the control module 40.

For example, the steering tuning module 344 receives a request to switch the operating mode from a current mode (first mode) to the selected operating mode (second mode), as shown at 1210. For example, the control module 40 may generated and/or send the request upon determining that the detected operating mode is different from the current operating mode. The steering tuning module 344, in response checks if the handwheel velocity, which is the rate at which the handwheel 14 is being moved, is below a predetermined threshold, as shown at 1220. The predetermined threshold may be 10 deg/sec, 20 deg/sec, or any other. The control module 40 switches the operating mode only if the handwheel velocity is below the predetermined threshold to avoid changes while the driver is in the middle of a maneuver. In addition, in one or more examples, the control module 40 may switch operating modes when the vehicle 10 is below specific vehicle speeds, for example, 10 KPH, 20 KPH, or any other. If the handwheel velocity is above (or equal) to the predetermined threshold, the steering tuning module 344 may wait for the handwheel velocity to reduce, as shown at 1230. For example, the steering tuning module 344 may check the handwheel velocity again after a predetermined duration. Alternatively, or in addition, the steering tuning module 344 may indicate to the control module 40 that the mode cannot be switched at this time, as shown at 1230.

Else, if the handwheel velocity is below the threshold, the steering tuning module 344 determines a configuration for the selected mode, as shown at 1240. For example, the steering tuning module 344 accesses a tuning table to obtain the configuration. In one or more examples, the steering tuning module 344 executes a low-pass filter (LPF) to avoid abrupt handwheel effort changes, as shown at 1250. For example, the configuration may include one or more calibration values for the steering system corresponding to the selected operating mode. The steering tuning module 344 facilitates changing the calibration values of the steering system 12 in a smooth manner for the driver to transition from the current operating mode to the selected operating mode to avoid abrupt handwheel torque.

The steering tuning module 344 sets the calibration values of the steering system, thus changing the mode to the selected operating mode, as shown at 1260. For example, each operating mode may provide a corresponding torque assist and/or feedback to the driver. For example, in the sport mode, the driver may have a tighter steering-feel because of a lower torque assist value compared to the comfort mode in which the driver may have a softer steering-feel because of a higher torque assist value provided by the steering system. Accordingly, in response to the selected mode, the steering tuning module 344 adjusts the torque assist generation of the steering system 12. Thus, the one or more operating modes have corresponding respective configurations for one or more components of the vehicle 10. In one or more examples, the configurations for the various operating modes are stored in memory, such as in a tuning table, or calibration table. The control module 40, upon detecting the operating mode that is to be selected, accesses the memory for the configurations for the one or more components of the vehicle 10.

Further, in one or more examples, the steering tuning module 344 sends an indication to other ECUs in the vehicle 10 to change to the selected operating mode. Alternatively, or in addition, the other ECUs receive the request to switch the operating mode earlier, such as in in parallel with the steering tuning module 344.

Accordingly, the technical solutions described herein facilitate a control module of a steering system to dynamically determine the operating mode in real time and without manual intervention based on input signal values by comparing the input signal values with a decision boundary, the decision boundary being determined by machine learning. The input signal values may include a vehicle speed, a handwheel position, and a lateral acceleration. The operating mode is indicative of a configuration that comprises calibration values for one or more components of the vehicle, such as the steering system, the suspension system, the braking system, the gearing system, the throttle system, the climate system, the infotainment system, and the like. By dynamically determining the operating mode, the technical solutions herein can switch the operating mode (for example, from a first mode to a second mode) without a manual request for such a switch. Thus, the technical solutions can facilitate a manufacturer to avoid costs of providing physical user-interface elements for switching the mode.

Further, by dynamically detecting the operating mode, the steering system provides steering dynamics according to the driving behavior without manual intervention for selection of the operating mode. Further yet, because the steering system uses a surface detection module, the steering system can monitor input signals for detecting the steering mode switching across different types of surfaces, irrespective of road friction conditions, such as high-mu, or low-mu conditions.

Further yet, because the classification boundary is dynamically determined based on input signals, the technical features herein adapt to changes made to one or more components of the vehicle. For example, consider that tires, suspension, or any other components of the vehicle, which affect one or more input signal values, such as the lateral acceleration, are changed. The classification boundary that differentiates the operating modes is, in response, revised based on the new input signal values resulting from the change(s). Thus, the steering system dynamically adapts to the changes in real time, and continues to select the operating mode based on the driving behavior using a revised classification boundary according to the new input signal values.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or the like. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
   a control module configured to dynamically determine an operating mode based on a set of input signal values comprising a plurality of lateral acceleration signal values and respectively corresponding handwheel position values; and
   the control module configured to calibrate the steering system according to operating mode that is determined.

2. The steering system of the claim 1, wherein the set of input signal values is a first set of input signal values, the operating mode is a first operating mode, and wherein the control module is further configured to:
   receive a second set of input signal values comprising a second plurality of lateral acceleration values and respectively corresponding handwheel position values;
   dynamically determine a second operating mode based on the second set of input signal values; and
   switch the steering system from the first operating mode to the second operating mode by calibrating the steering system according to the second operating mode.

3. The steering system of claim 2, wherein the control module switches the steering system from the first operating mode to the second operating mode without manual request for the switch.

4. The steering system of claim 2, wherein the first operating mode has a first torque assist feedback value and the second operating mode has a second torque assist feedback value.

5. The steering system of claim 1, wherein the set of input signal values further comprises a plurality of yaw rate signal values.

6. The steering system of claim 2, wherein the control module is further configured to indicate to an electronic control unit the switch from the first operating mode to the second operating mode.

7. The steering system of claim 1, wherein the control module is further configured to indicate to an electronic control unit the dynamically detected operating mode.

8. The steering system of claim 1, wherein the control module is configured to dynamically determine the operating mode based on the input signal values by comparing the input signal values with a decision boundary, the decision boundary being determined by machine learning.

9. The steering system of claim 8, wherein the control module is configured to determine the decision boundary based on:
   a min-table that comprises an entry for a handwheel position indicative of a minimum lateral acceleration signal value at said handwheel position; and
   a max-table that comprises an entry for said handwheel position indicative of a maximum lateral acceleration signal value at said handwheel position.

10. The steering system of claim 9, wherein the control module determines the decision boundary based on the min-table and the max-table in response to the lateral acceleration signal values in the min-table and the max-table being symmetric across handwheel position values.

11. A method implemented by a steering system, the method comprising:
    operating according to a first operating mode;
    receiving a set of input signal values comprising a plurality of lateral acceleration signal values and respectively corresponding handwheel position values;
    determining a second operating mode based on the set of input signal values and a decision boundary; and
    switching the steering system from the first operating mode to the second operating mode by calibrating the steering system according to the second operating mode.

12. The method of claim 11, further comprising:
    determining, prior to switching, a handwheel velocity of the steering system; and
    switching the steering system from the first operating mode to the second operating mode in response to the handwheel velocity being below a predetermined threshold.

13. The method of claim 11, wherein the first operating mode has a first torque assist feedback value and the second operating mode has a second torque assist feedback value.

14. The method of claim 11, wherein the decision boundary is a first decision boundary based on a first set of sample input values, and the method further comprising, determining a second decision boundary based on a second set of sample input values in response to a change in a predetermined set of components.

15. The method of claim 11, further comprising indicating to an electronic control unit of a component of a vehicle, the second operating mode.

16. A power steering system comprising:
a control module configured to:
dynamically learn a classification boundary between a first operating mode and a second operating mode, the classification boundary based on a first set of input signal values comprising a plurality of lateral acceleration signal values and respectively corresponding handwheel position values;
collect a second set of input signal values during operation of the power steering system in the first operating mode; and
dynamically switch from the first operating mode to the second operating mode based on the second set of input signal values corresponding to the second operating mode.

17. The power steering system of claim 16, wherein the control module determines the classification boundary by populating a min-table and a max-table using the first set of input signal values, wherein:
the min-table comprises an entry for each respective handwheel position, the entry indicative of a minimum lateral acceleration signal value at said handwheel position; and
the max-table comprises an entry for the each respective handwheel position, the entry indicative of a maximum lateral acceleration signal value at said handwheel position.

18. The power steering system of claim 17, wherein the control module determines the classification boundary based on a difference between the maximum lateral acceleration signal values and the minimum lateral acceleration signal values.

19. The power steering system of claim 17, wherein the control module determines the classification boundary in response to determining that the lateral acceleration signal values in the min-table and the max-table are symmetric across handwheel position values.

20. The power steering system of claim 16, wherein the control module is further configured to determine, prior to switching the operating modes, a handwheel velocity, and to switch the first operating mode to the second operating mode in response to the handwheel velocity being below a predetermined threshold.

* * * * *